United States Patent
Ding et al.

(10) Patent No.: US 6,591,230 B1
(45) Date of Patent: Jul. 8, 2003

(54) COPROCESSOR FOR SYNTHESIZING SIGNALS BASED UPON QUADRATIC POLYNOMIAL SINUSOIDS

(75) Inventors: Yinong Ding, Plano, TX (US); Ching-yu Hung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 320 days.

(21) Appl. No.: 09/687,546

(22) Filed: Oct. 13, 2000

Related U.S. Application Data (60) Provisional application No. 60/165,163, filed on Nov. 12, 1999.

(51) Int. Cl.$^7$ ................................................ G06F 3/00
(52) U.S. Cl. ........................ 702/189; 702/57; 702/183; 702/190
(58) Field of Search ............................. 702/57, 66, 71, 702/72, 80, 183, 189, 190; 370/503

(56) References Cited

U.S. PATENT DOCUMENTS

| | | | | |
|---|---|---|---|---|
| 5,343,404 A | * | 8/1994 | Girgis ........................ | 364/484 |
| 5,471,396 A | * | 11/1995 | White ........................ | 364/480 |
| 5,524,244 A | * | 6/1996 | Robinson et al. ........... | 395/700 |
| 5,893,054 A | * | 4/1999 | White ........................ | 702/189 |

OTHER PUBLICATIONS

Ding, et al.; *Processing of Musical Tones Using a Combined Quadratic Polynomial–Phase Sinusoid and Residual (QUASAR) Signal Model*, J. Audio Eng. Soc., vol. 45, No. 7/8 (1997), pp. 571–584.

Volder; *The CORDIC Trigonometric Computing Technique*, Trans. Electronic Computers, vol. EC–8 (IRE, 1959), pp. 330–334.

Wang, et al.; *Granularly–Pipelined CORDIC Processors for Sine and Cosine Generators*, Proc. Of the Int'l Conf. On Acoustics, Speech and Signal Processing (IEEE, 1996).

Bernardinis, et al.; *A Single Chip 1,200 Sinusoid Real–Time Generator for Additive Synthesis of Musical Signals*, Proc. Of the Int'l Conf. On Acoustics, Speech and Signal Processing (IEEE, 1997), pp. 427–430.

Houghton, et al.; *An ASIC for Digital Additive Sine–Wave Synthesis*, Computer Music Journal, vol. 19, No. 3 (1995), pp. 26–31.

* cited by examiner

*Primary Examiner*—Marc S. Hoff
*Assistant Examiner*—Felix Suarez
(74) *Attorney, Agent, or Firm*—Robert D. Marshall, Jr.; W. James Brady, III; Frederick J. Telecky, Jr.

(57) ABSTRACT

A coprocessor (15) for synthesizing a signal from the sum of sinusoids preferably includes an electronic system (20) having a host processor (12) that forwards frame boundary parameters to the coprocessor (15). Parameter registers (26) in coprocessor (15) store synthesis parameters for iteratively deriving amplitude and phase values for each sample point within a data frame. Adders (28, 30, 32) generate current amplitude from one addition, and current phase value from two additions, with the results stored back into parameter registers (26). A sine function calculator circuit (34), which may use a CORDIC technique, receives the current amplitude and phase values, and generates a digital component signal for the current sample point for one of the sinusoids. Digital component signals are accumulated at the sample point in a data sample buffer (40) and output at an output (44).

19 Claims, 4 Drawing Sheets

COPROCESSOR FOR SYNTHESIZING SIGNALS BASED UPON QUADRATIC POLYNOMIAL SINUSOIDS

CROSS-REFERENCE TO RELATED APPLICATIONS

This application claims priority under 35 USC §119(e)(1) of Provisional application No. 60/165,163, filed Nov. 12, 1999.

STATEMENT REGARDING FEDERALLY SPONSORED RESEARCH OR DEVELOPMENT

Not applicable.

BACKGROUND OF THE INVENTION

The invention is in the field of integrated circuit architecture, and is more specifically directed to an architecture for a logic integrated circuit for synthesizing signals.

Many modern electronics systems utilize synthesized analog signals to carry out their functions. There synthesized signals are typically generated by circuits that are referred to in the art as frequency synthesizers. For example, communications systems utilize frequency synthesizers to generate carrier and modulated signals to be transmitted, as well as in the demodulation of received communications signals. Filter tuning circuits in communications systems also utilize signals generated by frequency synthesizers. In recent years, so-called "frequency agile" communications systems have been developed, examples of which include spread spectrum local area networks (LANs), frequency hopped systems, and Code Division Multiple Access (CDMA) cellular telephone systems; each of these frequency agile systems also rely upon signals generated by frequency synthesizer circuits.

The rapid increase in the computing power that may be realized in an integrated circuit, according to modern technology, has expanded the ability of electronic systems to process multimedia information, including audio signals. Modern multimedia electronic systems, and multimedia functions embodied within computer systems, use frequency synthesizers to generate speech and music audio signals that are modeled as a sum of sinusoids, consistent with the Fourier theorem. For accurate synthesis of speech and audio signals, the frequency synthesizers in the multimedia systems are called upon to generate thousands of sinusoids at selected frequencies. For music synthesis, this sum of sinusoids may be combined with a stochastic components that models the "noisy" component of musical sounds, to produce an overall realistic sound; this stochastic component corresponds to effects such as breath noises in wind instruments, bowing noise in bowed stringed instruments, and variations in the sound of different pianos (e.g., grand versus upright).

Figure 1A:
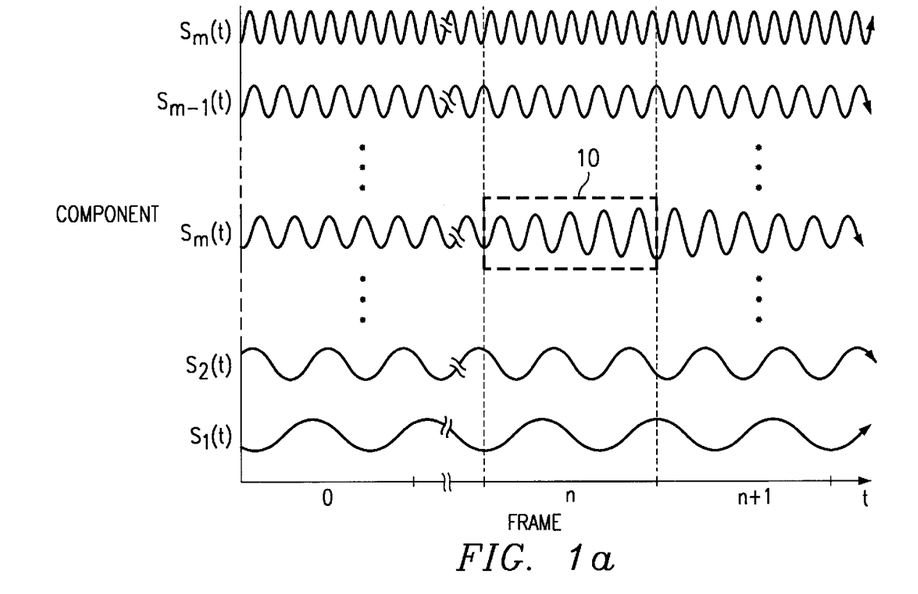
FIG. 1a is a timing diagram illustrating multiple sinusoidal components of a signal that may be synthesized according to both conventional techniques and also according to the preferred embodiment of the invention.

FIG. 1a illustrates a series of sinusoidal signal components to be generated by frequency synthesizer circuitry in complex electronic multimedia and communications systems. For purposes of digital signal processing, the time basis of these signals is generally subdivided into a series of frames, each frame containing a number of sample points. The complete synthesized signal $s^n(t)$ for the $n^{th}$ frame corresponds to the sum of M components, according to the relationship:

$$s^n(t) = \sum_{m=1}^{M} s_m^n(t)$$

In the communications context, this complete signal s(t), over all frames, corresponds to a single channel; multiple channels, each with a synthesized signal s(t), are then multiplexed in the conventional fashion to effect multi-channel communication.

Figures 1B, 2:
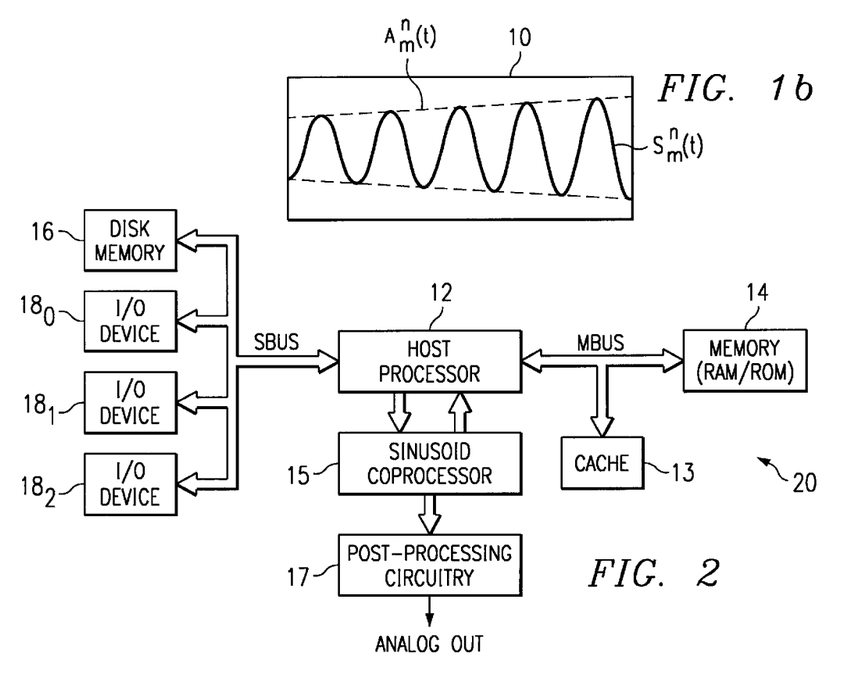

According to conventional signal synthesis techniques, each signal component within a single frame is subject to certain constraints. A typical example of such constraints, expressed for signal $s_m^n(t)$ of the $m^{th}$ component in the $n^{th}$ frame, is:

$$s_m^n(t) = A_m^n(t)\sin\{\theta_m^n(t)\}$$

where $A_m^n(t)$ is the instantaneous amplitude of the signal component, and where $\theta_m^n(t)$ is its instantaneous phase. As evident from this expression, both the amplitude and phase may vary over time within each frame of the signal component according to specified time functions. FIG. 1b illustrates an enlarged view of signal $s_m^n(t)$ of the $m^{th}$ component in the $n^{th}$ frame of FIG. 1a (bounded within box 10). The time-dependent amplitude $A_m^n(t)$ within this $n^{th}$ frame in this example is shown as a linearly increasing function with time, by way of example. Typically, certain constraints specifying the time-dependence of amplitude and phase are specified in the synthesis, such as the order (constant, linear, quadratic, etc.) with which the amplitude and phase may vary within a frame. Furthermore, while the particular time function for amplitude and phase variation may vary (and should vary, in order to communicate meaningful information) from frame to frame, the component signals $s_m^n(t)$ are required to be continuous across frame boundaries.

From the expression:

$$s_m^n(t) = A_m^n(t)\sin\{\theta_m^n(t)\}$$

it can be readily seen that the signal synthesis process according to this approach requires three steps, namely instantaneous phase calculation, sinusoidal function calculation, and sinusoidal amplitude weighting. Logic circuit architectures for synthesizing signals in this manner are known in the art. One architecture, described in Houghton, et al., "An ASIC for digital additive sine-wave synthesis", *Computer Music Journal*, Vol. 19, No. 3 (1995), pp. 26–31, effectively integrates the instantaneous frequency of the signal component to derive the instantaneous phase, uses a table lookup for performing the sinusoidal calculation, and implements the sinusoidal amplitude by a multiplier. Another architecture is described in Bernardinis, et al., "A single chip 1,200 sinusoid real-time generator for additive synthesis of musical signals", *Proc. of the International Conference on Acoustics, Speech, and Signal Processing* (IEEE, 1997), pp. 427–30, according to which a marginally stable second order filter-based oscillator bank generates the sinusoids, and a systolic array of multipliers apply the correct amplitudes to these sinusoids.

Each of these conventional architectures is limited in the accuracy with which the resultant signal is synthesized, primarily due to the limited accuracy with which the phases of the synthesized sinusoids are obtained. The Houghton, et al. approach, in which sinusoid phases are generated by integrating instantaneous frequency, completely ignores phase information and is thus inherently limited in its accuracy. It is believed that the Bernardinis, et al. architecture may produce audible artifacts in certain situations, for example in the case of steep frequency variation. Furthermore, it is believed that neither of these known architectures addresses the need for post-processing the synthesized sinusoids, further limiting their applicability.

BRIEF SUMMARY OF THE INVENTION

It is therefore an object of the present invention to provide a logic architecture for efficiently synthesizing multi-component sinusoidal signals.

It is a further object of the present invention to provide such an architecture that is suitable for implementation as a coprocessor.

It is a further object of the present invention to provide such an architecture for a coprocessor in which the number of sinusoid components that may be synthesized in real time is limited by the data transfer bandwidth between the host processor and the coprocessor, rather than by the sinusoidal computational rate.

It is a further object of the present invention to provide such an architecture in which multi-channel signals may be easily and efficiently generated.

Other objects and advantages of the present invention will be apparent to those of ordinary skill in the art having reference to the following specification together with its drawings.

The present invention may be implemented into a logic architecture, such as may be realized in the form of a coprocessor, for generating multiple component sinusoidal signals on a frame by frame basis. According to the present invention, frame boundary parameters for a specific frame and component are received, for example from a host processor. A first adder recursively determines the instantaneous amplitude of the component at a sample point by adding an amplitude delta value to the instantaneous amplitude from the previous sample point. A second parallel adder determines an instantaneous phase delta value by adding a $2^{nd}$ order delta value to the phase delta value from the previous sample point; this instantaneous phase delta value is then added to the instantaneous phase value from the previous sample point at a third adder. The output from the first and third adders are applied to a sine function calculator. The output of the sine function calculator is accumulated over all components of the signal, at each of the sample points in the frame. Upon accumulation of the sine function calculator for the final component, each sample point signal value is output, for example to memory or to the host processor.

BRIEF DESCRIPTION OF THE SEVERAL VIEWS OF THE DRAWING

FIG. 1b is a timing diagram illustrating one frame of one of the component signals shown in FIG. 1a.

FIG. 2 is an electrical diagram, in block form, of an electronic system constructed according to the preferred embodiment of the invention.

DETAILED DESCRIPTION OF THE INVENTION

The present invention may be utilized in connection with any one of a number of electronic devices and systems, particularly those in which the synthesis of signals based upon the sum of sinusoids is useful. Examples of such systems include radar systems using pulse compression techniques, and frequency-agile communications systems such as spread spectrum local area networks (LANs), frequency hopped systems, and Code Division Multiple Access (CDMA) cellular telephone systems. The present invention is contemplated to be particularly beneficial when used in multimedia systems in which signal synthesis is used in connection with music and speech audio applications. Given the wide range of applications of the present invention, the preferred embodiment of the present invention will be described in connection with a somewhat generic electronic system, it being understood that those skilled in the art having reference to this description will be readily able to implement the present invention in connection with the above-noted, and other, applications for which signal synthesis is useful.

FIG. 2 illustrates exemplary electronic system 20, into which the preferred embodiment of the present invention may be implemented. System 20 includes host processor 12, which is preferably a high performance digital signal processor (DSP), or general-purpose microprocessor. For example, particularly in the context of multimedia electronic systems, it is contemplated that host processor 12 may be a high or medium performance DSP, such as a member of the TMS320C6000 or TMS3200 C 5000 DSP families, respectively, manufactured by Texas Instruments Incorporated. In this regard, the processing capacity of host processor 12 in system 20 according to this preferred embodiment of the present invention is contemplated to be substantial, consistent with modern central processing units (CPUs) that are currently available.

In this regard, the architecture of exemplary system 20 surrounding host processor 12 is contemplated to be similar to that of many CPU-based systems. In this regard, host processor 12 is coupled to memory system 14 by way of memory bus MBUS. Memory system 14 includes random access memory (RAM) for data and program storage; additionally, if appropriate for the particularly application, memory system 14 may include read-only memory (ROM) for boot or program storage. As shown in FIG. 2, cache memory 13 may also be coupled to host processor 12 via memory bus MBUS, for high performance operation. Host processor 12 also interfaces with system bus SBUS, by way of which communication with various input/output devices 18, including disk memory 16, may be carried out. Of course, the presence or absence of disk memory 16, as well as the number and nature of the various input/output devices 18, will depend upon the particular application.

According to the preferred embodiment of the invention, host processor 12 is also bidirectionally coupled to sinusoid coprocessor 15. Sinusoid coprocessor 15 includes logic for deriving digital data corresponding to the sum of sinusoidal components, as will be described in detail hereinbelow. In similar manner as coprocessors generally, sinusoid coprocessor 15 receives operands from host processor 12 in combination with control signals corresponding to a coprocessor instruction, and executes the corresponding routine. Upon completion, sinusoid coprocessor 15 applies the results of the coprocessor routine, in the form of operands or other data, to post-processing circuitry 17. Post-processing circuitry 17, in this embodiment of the invention, includes circuit functions for using or processing synthesized digital signals generated by sinusoid processor 15; by way of example, post-processing circuitry 17 may include digital filters, effects processors, digital-to-analog converters, and the like, individually or in combination with one another. The output of post-processing circuitry 17 in this exemplary realization is shown in FIG. 2 as an analog signal presented on line ANALOG OUT. Alternatively, sinusoid coprocessor 15 may forward the results of the coprocessor routine to host processor 12, for additional signal processing thereby.

The extent to which system 20, and particularly host processor 12 and coprocessor 15, are physically integrated, will depend upon the particular technology used as well as the desired application. For example, sinusoid coprocessor 15 a separate integrated circuit from host processor 12; alternatively, as known in the art, sinusoid coprocessor 15 may be implemented into th same integrated circuit chip as hot processor 12. Additionally, cache memory 13 may be partially or fully integrated with host processor 12, as is known in the art. In any event, the buses illustrated in FIG. 2 for system 20 are contemplated to correspond to the interconnection of the functional blocks, whether realized within one or more integrated circuit devices.

According to this preferred embodiment of the invention, sinusoid coprocessor 15 generates a digital signal that corresponds to the sum of multiple sinusoidal components. As described above, a model for such a synthesized signal $s^n(t)$, for the $n^{th}$ frame in a series of frames, corresponds to a sum of M components:

$$s^n(t) = \sum_{m=1}^{M} s_m^n(t)$$

where each component signal $s_m^n(t)$ is expressed for the $m^{th}$ component in the $n^{th}$ frame by:

$$s_m^n(t) = A_m^n(t)\sin\{\theta_m^n(t)\}$$

$A_m^n(t)$ is the instantaneous amplitude of the signal component, and $\theta_m^n(t)$ is its instantaneous phase. According to the preferred embodiment of the invention, the instantaneous amplitude and phase relationships are estimated as linear combinations of linear and quadratic spline functions, as follows:

$$A_m^n(t) = A_m^n(t) + A_m^{n+1} A_{n+1}(t)$$

$$\theta_m^n(t) = \omega_m t + \alpha_m^{n-2} B_{n-2}(t) + \alpha_m^{n-1} B_{n-1}(t) + \alpha_m^n B_n(t)$$

In these expressions, $A_n(t)$ and $B_n(t)$ are linear and quadratic B-splines, respectively, and $\omega_m$ is the nominal frequency of this $m^{th}$ component.

Also as noted above, each component signal $s_m^n(t)$ is continuous across frame boundaries, which places useful constraints upon the modeling of each component signal $s_m^n(t)$. According to this preferred embodiment of the invention, one may algorithmically calculate a component signal $s_m^n(t)$ within each frame given the values of frame boundary conditions:

$$\{A_m^n, \alpha_m^{n-2}, \alpha_m^{n-1}\} \text{ and } \{A_m^{n+1}, \alpha_m^n\}$$

This approach to the calculation of component signal $s_m^n(t)$ is described in Ding, et al., "Processing of Musical Tones Using a Combined Quadratic Polynomial-Phase Sinusoid and Residual (QUASAR) Signal Model", *Audio Eng. Soc.*, Vol. 45, No. 7/8 (July/August 1997), pp, 571–584, incorporated herein by this reference. For purposes of clarity of this description, the theory of operation of this algorithm will now be described.

Consider each data frame to consist of L samples, such that time variable t=nL+k, where k is the index of the samples such that k=0, 1, . . . , L-1. One may recursively calculate a first order polynomial by one addition, and a second order polynomial by two additions. As noted above, the instantaneous amplitude $A_m^n(t)$ is expressed in connection with a first order B-spline. Accordingly, the instantaneous amplitude for the $k^{th}$ sample in the $n^{th}$ frame for the $m^{th}$ sinusoid component may be expressed by the sum:

$$A_m^n(nL+k) = A_m^n(nL+k-1) + \Delta A_m^n$$

As will be described below, the difference operand $\Delta A_m^n$ is derived from the frame boundary constraints that render the sinusoidal component continuous across frames.

Similarly, because the instantaneous phase $\theta_m^n(t)$ is based upon quadratic B-splines, two additions are required for its recursive calculation. According to the theory of operation of the preferred embodiment of the present invention, these two additions are performed, for the $m^{th}$ component, by the combination of an intermediate difference value $x_m^n(k)$:

$$x_m^n(k) = x_m^n(k-1) + \Delta x_m^n$$

with an addition to generate the instantaneous sample phase $\theta_m^n(nL+k)$ as follows:

$$\theta_m^n(nL+k)=\theta_m^n(nL+k-1)+x_m^n(k)$$

The difference value $\Delta x_m^n$ is also derived from the inter-frame boundary conditions, as will now be described.

As noted above, the frame boundary conditions set the values of $A_m^n$ and $A_m^{n+1}$, and of $\alpha_m^{n-2}$, $\alpha_m^{n-1}$, and $\alpha_m^n$. These boundary conditions set the initial conditions for the difference values $\Delta A_m^n$ and $x_m^n(k)$, as well as other initial conditions. In this regard, the initial value of difference value $\Delta A_n^n$ may be derived as:

$$\Delta A_m^n = \frac{(A_m^{n+1} - A_m^n)}{L}$$

For the second-order determination of instantaneous phase $\theta_m^n(nL+k)$, the following initial conditions are derived:

$$\theta_m^n(nL) = \omega_m nL + \frac{(\alpha_m^{n+1} + \alpha_m^{n-2})}{2}$$

$$\omega_m^{n+1} = \omega_m + \frac{(\alpha_m^n + \alpha_m^{n-1})}{L}$$

$$\Delta x_m^n = \frac{(\omega_m^{n+1} - \omega_m^n)}{L}$$

$$x_m^n(0) = \omega_m^n - \frac{\Delta x_m^n}{2}$$

Beginning from these initial conditions for the frame, one may thus derive the values of instantaneous amplitude $A_m^n(nL+k)$ and instantaneous phase $\theta_m^n(nL+k)$ for the $k^{th}$ sample in the $n^{th}$ frame of the $m^{th}$ component of the signal. These values of instantaneous amplitude and instantaneous phase may then be combined to form the $k^{th}$ sample of the $m^{th}$ sinusoid component in frame n as follows:

$$s_m^n(nL+k)=A_m^n(nL+k)\cdot\sin\{\theta_m^n(nL+k)\}$$

The m sinusoid components are then summed to form the overall signal $s^n(nL+k)$ at each sample point in frame n.

Figure 3:
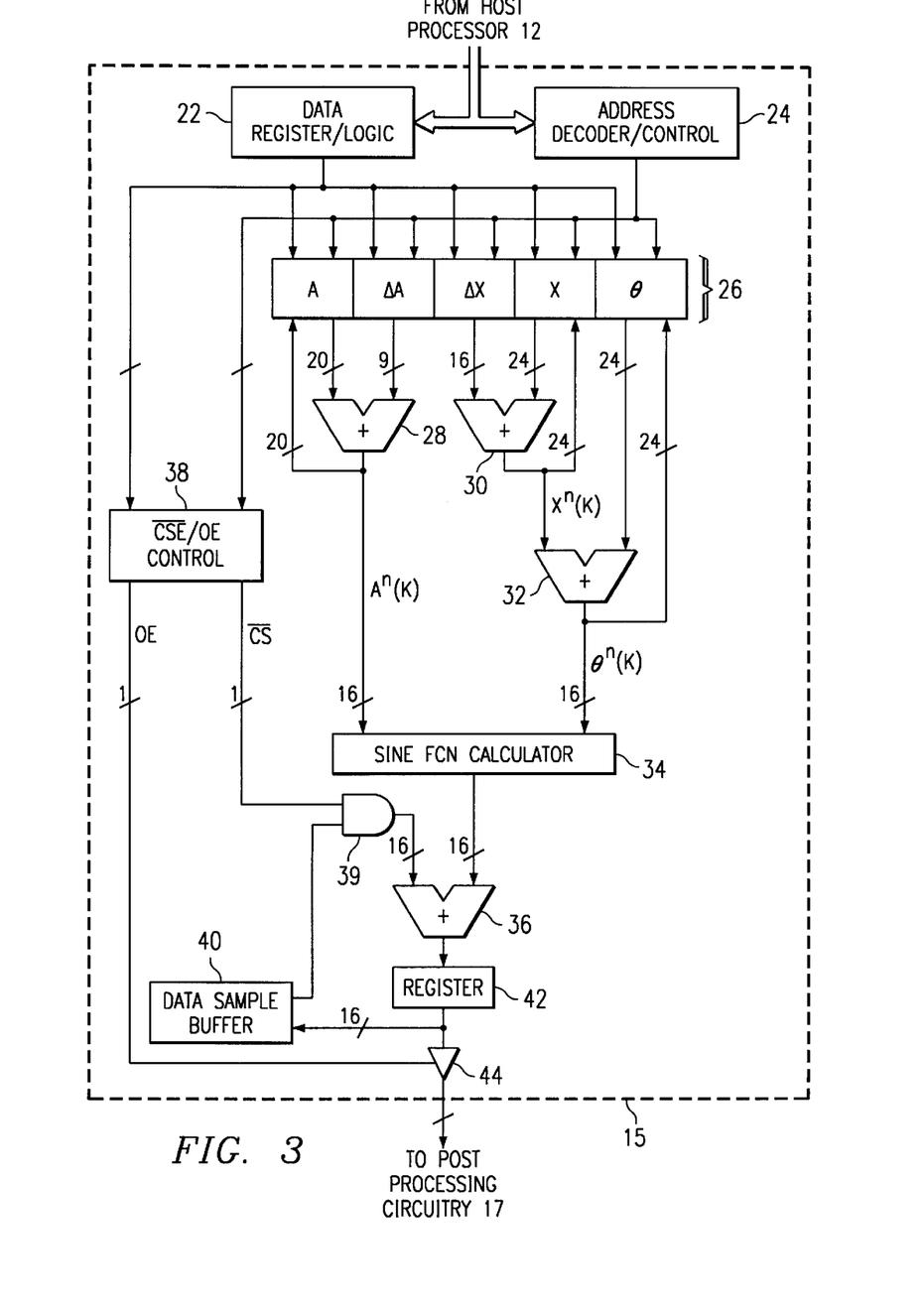
FIG. 3 is an electrical diagram, in block form, of a coprocessor in the electronic system of FIG. 2, constructed according to the preferred embodiment of the invention.

Referring now to FIG. 3, the construction of sinusoid coprocessor 15 according to the preferred embodiment of the invention will now be described in detail. While this exemplary architecture is particularly suited for and efficient in carrying out signal synthesis according to the present invention, it is of course contemplated that variations in this architecture may also be apparent to those skilled in the art having reference to this specification. Such variations and alternative architectures are contemplated to be within the scope of the present invention.

As shown in FIG. 3, sinusoid coprocessor 15 includes data register and logic 22 for receiving data operands from host processor 12. These operands correspond to the frame boundary parameters $\{A_m^n, \alpha_m^{n-2}, \alpha_m^{n-1}\}$ and $\{A_m^{n+1}, \alpha_m^n\}$, and are preferably received by way of a direct memory access (DMA) operation by host processor 12, or alternatively by way of buffered serial ports. Data register and logic 22 also includes memory space for storing other parameters involved in the coprocessor operation, particularly in initialization of sinusoid coprocessor 15 for the initial sample of a frame; such other parameters include nominal frequencies $\omega_m^n$ for each of the m sinusoidal components, and the frame boundary parameters $\{A_m^n, \alpha_m^{n-2}, \alpha_m^{n-1}\}$ of each component m generated in the previously processed frame. Similarly, address decoder and control circuitry 24 of sinusoid coprocessor 15 receives instruction codes and control signals from host processor 12, according to which sinusoid processor 15 operates to generate the synthesized sum-of-sinusoid signals from the operands received by data register and logic 22. Additionally, address decoder and control circuitry 24 controls other resources within sinusoid coprocessor 15 to accomplish initialization of registers and the like.

Parameter registers 26 receive parameters from host processor 12 via data register and logic 22, under the control of address decoder and control circuitry 24. According to the foregoing discussion of the theory under which sinusoid coprocessor 15 operates, and as will become apparent from the following description, parameter registers 26 store the various parameters to be used in the recursive generation of the synthesized signal for the next ($k^{th}$) sample period within the current ($n^{th}$) frame. In this regard, parameter register A stores the current instantaneous amplitude value $A_m^n(nL+k-1)$ for sample k-1 within frame n, parameter register $\Delta A$ stores the current value of $\Delta A_m^n$ for frame n, parameter register $\Delta X$ stores the current difference value $\Delta x_m^n$ for frame n, parameter register X stores the current value of $x_m^n(k-1)$ for the k-1$^{th}$ sample in the $n^{th}$ frame, and parameter register $\theta$ stores the current instantaneous phase value $\theta_m^n(nL+k-1)$ for sample k-1 of frame n. All of these parameters are specific to the $m^{th}$ component sinusoid.

Adder 28 performs the addition of the contents of parameter register A and the contents of parameter register $\Delta A$. In this example, parameter register A presents a twenty-bit current instantaneous amplitude value $A_m^n(nL+k-1)$, and parameter register A presents nine-bit difference value $\Delta A_m^n$, with the nine bits corresponding to the nine least significant bits of the twenty-bit current instantaneous amplitude value $A_m^n(nL+k-1)$ stored in parameter register A. Adder 28 produces a twenty-bit value corresponding to the sum of these parameters, namely instantaneous amplitude $A_m^n(nL+k)$ for the $k^{th}$ sample in frame n, and returns this twenty-bit sum to parameter register A for storage and use in the next iteration (for sample k+1). The sixteen most significant bits of this sum are forwarded to sine function calculator 34, on lines $A^n(k)$ as shown in FIG. 3.

Adder 30 similarly receives and adds the contents of parameter registers $\Delta X$ and X. In this example, parameter register X stores a twenty-four bit intermediate difference value $x_m^n(k-1)$, and parameter register $\Delta X$ stores a sixteen bit difference value $\Delta x_m^n$ (corresponding to the sixteen last significant bits of the contents of parameter register X). Adder 30 produces a twenty-four bit sum of these parameters, the sum corresponding to the next intermediate difference value $x_m^n(k)$, and presents this result to parameter register X for storage and use for the next sample k+1, and to one input of adder 32.

Adder 32 also receives, as a twenty-four bit value in this example, the contents of parameter register $\theta$, which contains instantaneous phase value $\theta_m^n(nL+k-1)$ for sample k-1. The sum produced by adder 32 corresponds to the instantaneous phase value $\theta_m^n(nL+k)$ for sample k, and is returned to parameter register $\theta$ for storage and use in the next sample period K+1. The sixteen most significant bits of this value are forwarded to sine function calculator 34, on lines θ"(k).

As evident from the foregoing description, sine function calculator receives the instantaneous amplitude and phase values $A_m''(nL+k)$, $\theta_m''(nL+k)$, respectively, for sample k. As noted above, the actual $k^{th}$ value of the $m^{th}$ sinusoidal component at sample point k in frame n is given by:

$$s_m''(nL+k) = A_m''(nL+k) \cdot \sin\{\theta_m''(nL+k)\}$$

or, in other words, by the product of the instantaneous amplitude $A_m''(nL+k)$ and the sine of the instantaneous phase $\theta_m''(nL+k)$. In this preferred embodiment of the present invention, sine function calculator 34 calculates this product.

Sine function calculator 34 may be implemented by way of any one of a number of known circuit and algorithmic functions for generating the sine value of a digitally presented angle, and for applying an amplitude thereto. Examples of useful conventional techniques for performing this calculation include Padé approximation, and table lookup approaches. Between these two techniques, table lookup is more likely to be useful in connection with an integrated circuit such as sinusoid coprocessor 15, in that a relatively simple ROM table and multiplier may be readily implemented to provide the desired product.

According to the preferred embodiment of the present invention, however, sine function calculator 34 is implemented by way of a the Coordinate Rotation Digital Computer (CORDIC) technique described in Volder, "The CORDIC Trigonometric Computing Technique", *IRE Transactions on Electronic Computers*, Vol. EC-8 (September, 1959), pp. 330–334.

As described in the Volder article, trigonometric functions of a given angle, at a given magnitude, may be iteratively derived by the pseudo-rotation of the corresponding vector to a zero angle. The pseudo-rotation is carried out by modifying the x and y vector components by increments derived from an angle of rotation that has a decreasing magnitude with each iteration, as will now be described. For the case of an initial vector having a magnitude A and an angle θ, the CORDIC technique may begin by initializing an x component $X_1$ to the magnitude $A_1$, an angle value $\theta_1$ to the value θ, and a y component $Y_1$ to zero. According to the CORDIC technique, the second values $X_2$, $Y_2$ of the x and y components, respectively, are determined by:

$$X_2 = \mp Y_1$$

$$Y_2 = \pm X_1$$

which amounts to a ±90° rotation of the initial vector. The sign of the rotation depends upon a comparison between the initial phase angle θ and 90°; if the initial phase angle θ exceeds 90°, the rotation is positive (such that $X_2 = -Y_1$ and $Y_2 = X_1$), and vice versa. The next phase angle value $\theta_2$ is derived as the difference θ−90°. As described in the Volder article, subsequent iterations for $X_{i+1}$ and $Y_{i+1}$ are carried out by evaluation of:

$$X_{i+1} = X_i - \xi_i 2^{-(i-2)} Y_i$$

$$Y_{i+1} = Y_i + \xi_i 2^{-(i-2)} X_i$$

where:

$$\xi_i = \begin{cases} -1, & \text{for } \theta_i < \alpha_i \\ +1, & \text{for } \theta_i > \alpha_i \end{cases}$$

for:

$$\alpha_i = \tan^{-1} 2^{-(i-2)}$$

The set of angles $\alpha_i$ may be precalculated, as these iteration-dependent angles are not data-dependent.

The iterative generation of the values of $X_{i+1}$, $Y_{i+1}$ is well-suited for execution by digital logic. As evident from the above equations, this operation involves the cross-addition of the current X and Y values $X_i$, $Y_i$, where on the of the terms is divided by a power of two that depends upon the current iteration. Of course, division by a power of two may be readily performed simply by shifting a digital value.

The CORDIC trigonometric determination is most easily carried out for a specified number of iterations, with the total number K of iterations being defined according to a worst case error. In the determination of the sine of an angle, the result may simply be found as the terminal Y value $Y_K$ at the end of the K iterations. It should be noted that this value should be normalized, either prior to the initializing of the $X_1$, $Y_1$ values or after the K iterations, in order to account for the increase in the magnitude of the vectors that results in each cross-addition. This magnitude increase depends only upon the number of iterations, and not upon the value of the operands, and as such the normalization factor may be preset in the calculation.

Figures 4, 5:
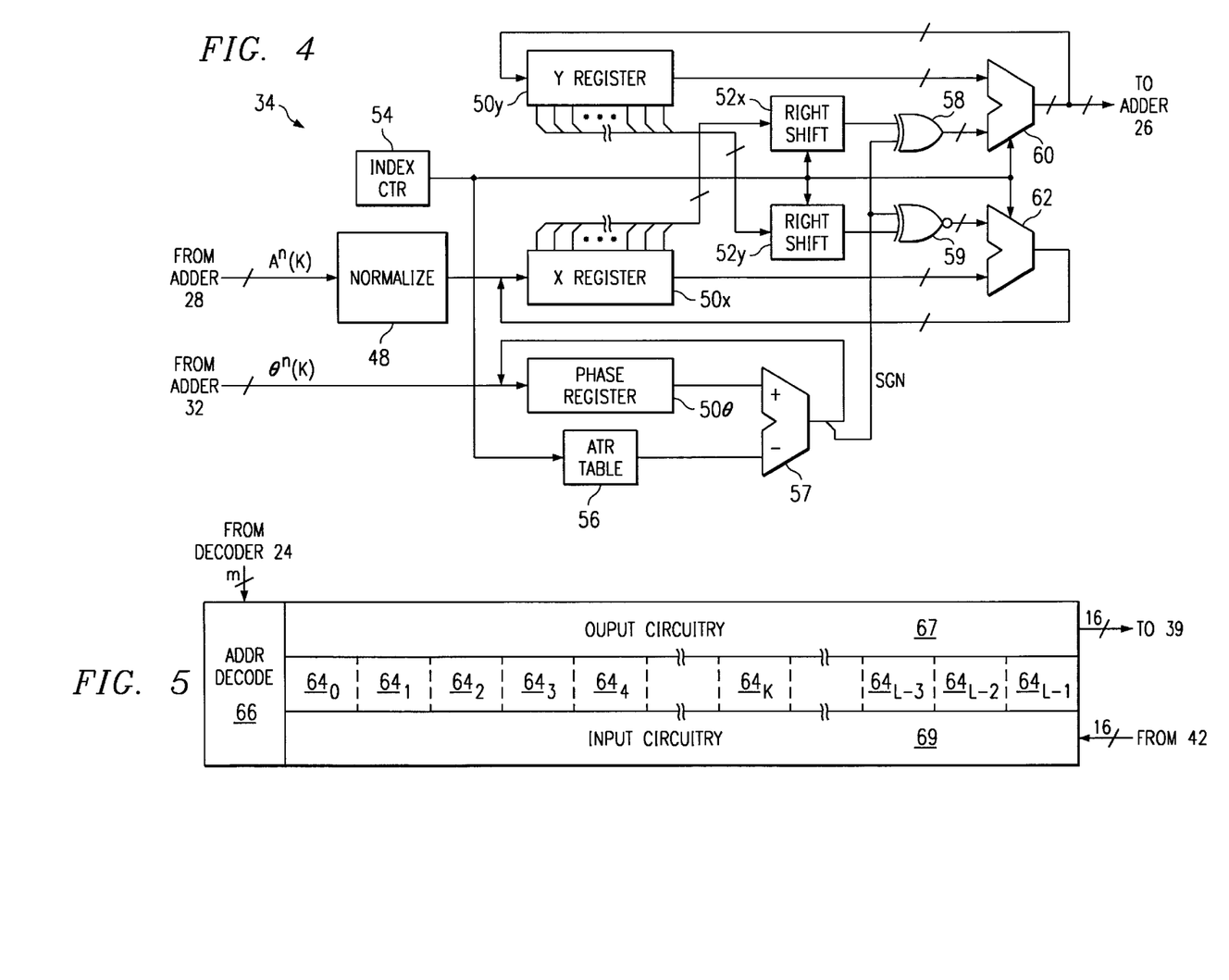
FIG. 4 is an electrical diagram, in block form, of a sine function calculator in the coprocessor of FIG. 3 according to the preferred embodiment of the invention.
FIG. 5 is a memory map of the data sample buffer in the coprocessor of FIG. 3 according to the preferred embodiment of the invention.

Referring now to FIG. 4, the construction of sine function calculator 34 for calculating the signal $s_m''(k)$ for the $m^{th}$ component sinusoid by following the CORDIC technique, and according to this preferred embodiment of the invention, will now be described. Of course, other realizations of the CORDIC technique may alternatively be used in the implementation of sine function calculator 34 in sinusoid coprocessor 15. An example of one such alternative realization is described in Wang, et al., "Granularly-Piperlined CORDIC Processor for Sine and Cosine Generators", *Proc. of the International Conference on Acoustics, Speech and Signal Processing* (IEEE, 1996). However, it is contemplated that the arrangement of FIG. 4 is particularly efficient for implementation into a microprocessor-like architecture.

As shown in FIG. 4, lines A"(k) from adder 28 are received by normalizer 48 in sine function calculator 34; normalizer 48 adjusts the digital value corresponding to the current instantaneous amplitude $A_m''(nL+k)$ to compensate for the increase in magnitude produced by a specified number of iterations in the CORDIC routine, as noted above. Alternatively, the output of sine function calculator 34 may be so normalized, if desired. The output of normalizer 48 is applied to X register 50x. Lines θ"(k) from adder 32 are received by phase register 50θ of sine function calculator 34, such that the instantaneous phase value $\theta_m''(nL+k)$ is stored therein.

Outputs of X register 50x are applied to right shift register 52x, and to one input of adder 62. Similarly, Y register 50y (which is initialized to zero) has an output applied to right shift register 52y and to one input of adder 60. Right shift registers 52x, 52y are each controlled by the output of index counter 54, to apply a right shift by a number of bits corresponding to the iteration index i, as described above. The outputs of right shift registers 52x, 52y are applied to second inputs of X and Y adders 62, 60, respectively (via exclusive-OR function 58 and exclusive-NOR function 59, as will be described below), to effect the CORDIC cross-addition operation. Adders 60, 62 also receive a control input from index counter 54, which causes adders 60, 62 to simply select the gated output of right shift registers 52x, 52y in the first iteration (with no addition performed), thus applying the initial ±90° rotation. The output of X adder 62 is forwarded back to X register 50x, to store the new value $X_{i+1}$ for use in the next iteration. The output of Y adder 60, which presents the value $Y_{i+1}$, is similarly forwarded back to Y register 50y for use in the next iteration. Additionally, because sine function calculator 34 is for calculating a sine function, the output of Y adder 60 is also forwarded to adder 36 (FIG. 3) in sinusoid coprocessor 15, to communicate thereto the final result of the sine function calculation upon completion of the desired number K of iterations.

As noted above, the cross-addition operation performed by X and Y adders 62, 60, respectively, applies a pseudo-rotation to the current x and y components $X_i$, $Y_i$, through an angle corresponding to the current iteration. As also described above, the direction of rotation (i.e., the sign of the rotation angle) depends upon the sign of a comparison of the current contents of phase register 50θ with an angle $\alpha_i$ that depends upon the iteration index. In this regard, the output of phase register 50θ is applied to a positive input of adder 57, and the output of ATR table 56 is applied to a negative input of adder 57. ATR table 56 is a look-up table storing a sequence of arctangent values that are sequentially output from iteration-to-iteration, in response to the current value of index counter 54, thus providing the values of angles $\alpha_i$ to adder 57. As noted above, these angles $\alpha_i$ may be derived as:

$$\alpha_i = \tan^{-1} 2^{-(i-2)}$$

and thus follows a sequence of 90°, 45°, 26.5°, . . . .These angles $\alpha_i$ are subtracted from the current contents of phase register 50θ by adder 57, with the resulting difference (i.e., angle $\theta_{i+1}$) being stored back into phase register 50θ for use in the next iteration. The sign bit of the output of adder 57 is forwarded, on line SGN, to an input of each of exclusive-OR function 58 and exclusive-NOR function 59, to effectively pass or invert the shifted output of right shift registers 52x, 52y, respectively, in response to the angle comparison. As such, exclusive-OR function 58 and exclusive-NOR function 59 implement the ξ function described above relative to the CORDIC technique.

In operation, sine function calculator 34 receives the instantaneous amplitude value $A_m{}''(nL+k)$ from adder 28 (FIG. 3) on lines A″(k), and the instantaneous phase value $\theta_m{}''(nL+k)$ from adder 32 on lines θ″(k). At this point, index counter 54 is reset (e.g., to the value "1"), and the contents of Y registers 50y is reset to zero. Normalizer 48 adjusts the instantaneous amplitude value $A_m{}''(nL+k)$ to account for the increase in amplitude caused by the sine calculation for K iterations, and stores the adjusted amplitude value in X register 50x. The instantaneous phase value $\theta_m{}''(nL+k)$ on lines θ″(k) is stored in phase register 50θ.

For the first iteration, in which a pseudo-rotation of ±90° is applied, adder 57 compares the value of 90° (stored in the first location within ATR table 56) with the current value $\theta_1$ stored in phase register 50θ, which is instantaneous phase value $\theta_m{}''(nL+k)$ from adder 32. The sign of the result of this subtraction is applied to inputs of exclusive-OR function 58 and to exclusive-NOR function 59, via line SGN. Meanwhile, the initial contents of X register 50x and Y register 50y are stored in right shift registers 52x, 52y, respectively. As this is the first iteration, no shift is applied by right shift registers 52x, 52y, and their outputs are applied to exclusive-OR function 58 and to exclusive-NOR function 59. One of exclusive-OR function 58 and exclusive-NOR function 59 will invert its input (which, in the case of exclusive-NOR function 59, is zero from Y register 50y), and the outputs of both will be applied to adders 60, 62, respectively. Because this is the first iteration, as indicated by index counter 54, adders 60, 62 simply forward the outputs of exclusive-OR function 58 and exclusive-NOR function 59, respectively, to Y register 50y and X register 50x. No valid output is generated by Y adder 60 at this point in the process.

Sine function calculator 34 then continues its iterative processing with iteration i=2, up to reaching a preselected number K of iterations. In each such iteration, the values $x_i$, $y_i$ are forwarded from their respective X and Y registers $50_x$, $50_y$ to right shift registers 52x, 52y, respectively. Right shift registers 52x, 52y output these values, shifted by a number of bits indicated by the current value of the iteration index i (i.e., shifted right by i−2 bits), and applies the shifted results to exclusive-OR function 58 and exclusive-NOR function 59, respectively. Meanwhile, the current phase angle $\theta_i$ has a current angle $\alpha_i$ subtracted therefrom by adder 57 to generate next phase angle $\theta_{i+1}$, which is stored back into phase register 50θ; the sign of this next phase angle $\theta_{i+1}$ is applied to exclusive-OR function 58 and exclusive-NOR function 59 to invert the appropriate one of the outputs of right shift registers 52x, 52y. Adders 60, 62 then add these values to the current values $y_i$, $x_i$, respectively, to produce new values $y_{i+1}$, $x_{i+1}$; these sums are then stored back into their respective Y register 50y and X register 50x.

This iterative process is repeated for a number K of iterations, which is typically preselected according to a worst case design. Upon completion of the $K^{th}$ iteration, the final sine result, which corresponds to the value $y_K$, is output from adder 60 of sine function calculator 34. This signal is applied to one input of adder 36, as shown in FIG. 3, to which reference is now again directed for description of the remainder of the construction of sinusoid coprocessor 15.

Adder 36 of sinusoid coprocessor 15 serves to accumulate the signal components for each sample point k within frame n, over all M sinusoids. In this regard, the second input of adder 36 receives a value from data sample buffer 40, via AND function 39. As shown in FIG. 3, the output of data sample buffer 40 is applied to one input of multi-bit AND function 39, while a control signal generated on line $\overline{CS}$ by channel separation control 38 is applied as a second input thereto, thus gating the application of the output of data sample buffer 40 to adder 36. In this manner, channel separation control 38 controls whether the current output of adder 36 accumulates with (line $\overline{CS}$ high), or instead initializes (line $\overline{CS}$ low), the contents of data sample buffer 40. The output of adder 36 is temporarily stored in register 42, the output of which is applied to an input of data sample buffer 40 and also to output buffer 44. Output buffer 44 presents the result of the accumulated sample values to post-processing circuitry 17 (or, alternatively, to host processor 12), under the control of a signal from channel separation control 38 on line OE.

As noted above, data sample buffer 40 is used in the accumulation of signals over the M sinusoids for each sample k within frame n, for a given output signal channel. FIG. 5 illustrates the architecture of data sample buffer 40 according to the preferred embodiment of the invention. Data sample buffer 40 includes L entries 64, one for each of the L sample periods within a data frame. In this example, each ordered entry $64_0$ through $64_{L-1}$ is a sixteen-bit memory location, corresponding to the sixteen-bit output of (and input to, in this case) adder 36. Address decoder 66 receives control signals from address decoder and control circuitry 24, so as to point to entries 64 in a sequential manner corresponding to the operation of sinusoid coprocessor 15. In this regard, the operation of data sample buffer 40 will point to the entry 64 corresponding to the currently processed sample point within the data frame; for example, if sinusoid coprocessor 15 is generating signal $s_m{}^n(nL+k)$, address decoder 66 in data sample buffer 40 will direct output and input operations to entry $64_k$. Data sample buffer 40 also includes output circuitry 67 for communicating the contents of the entry 64 selected by address decoder 66 to adder 36 via AND function 39, and input circuitry 69 for writing the output from adder 36 (via register 44) to the entry 64 selected by address decoder 66.

Referring back to FIG. 3, the output of register 42 is also applied to output buffer 44. Output buffer 44 interfaces with post-processing circuitry 17 (or, alternatively, with host processor 12), so as to return the result of the sinusoidal coprocessing instruction. In this regard, output buffer 44 returns the final results of the signal $s^n(nL+k)$ for all sample points k within the $n^{th}$ frame, for a given channel. As such, output buffer 44 is controlled by an output enable signal on line OE driven by channel separation control 38, to enable output buffer 44 to present the accumulated output from adder 36 for each sample k within the frame for the $M^{th}$ (i.e., the last) sinusoidal component. This accumulated result will include the sum of all M sinusoidal components for each of the k samples, with the components m=1, ..., M−1 having been saved within data sample buffer 40, and added to the final component values of component m=M by adder 36.

Figures 6, 7:
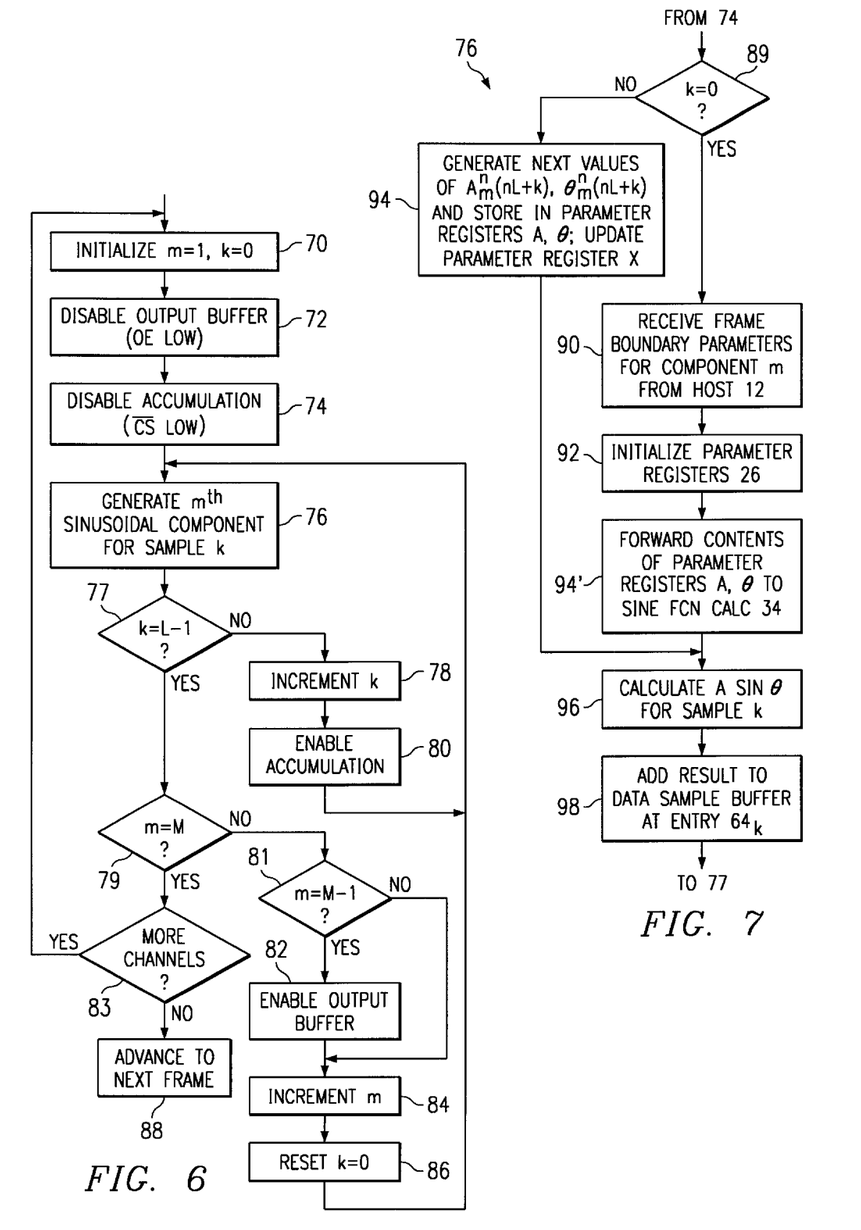
FIG. 6 is a flow diagram illustrating the operation of the coprocessor of FIG. 3 according to the preferred embodiment of the invention.
FIG. 7 is a flow diagram illustrating the generation of sinusoidal component values in the operation of the coprocessor illustrated in FIG. 6, according to the preferred embodiment of the invention.

Referring now to FIG. 6, the operation of sinusoid coprocessor 15 according to the preferred embodiment of the present invention will now be described in detail. As will be apparent from the following description, the operation illustrated in FIG. 6 is applicable to multi-channel operations, where separate and independent signals $s^n(t)$ are generated for multiple channels in each frame. Additionally, the operation illustrated in FIG. 6 is described hereinbelow in connection with a single frame, it being understood that the process may be repeated for such number of frames as to be communicated by system 20 within which sinusoid coprocessor 15 is embodied.

According to the preferred embodiment of the invention, the operation of sinusoid coprocessor 15 is initiated by host processor 12 issuing a coprocessor instruction to sinusoid coprocessor 15, in response to which sinusoid coprocessor 15 begins the generation of signal components for a frame. Sinusoid coprocessor 15 begins this generation with the initialization of component index m to 1, and of sample point index k to 0. In process 72, channel separation control 38 disables output buffer 44 by driving line OE low. Since, at this point in the process, the first component (m=1) is to be generated for a frame, any previous signal results in data sample buffer 40 belong to a previous frame, and should not be included in the accumulation of the next signal components generated by sinusoid coprocessor 15. Accordingly, channel separation control 38 disables accumulation of results into data sample buffer 40 by driving line $\overline{CS}$ low in process 74.

Following the initialization of processes 70, 72, 74, sinusoid coprocessor 15 next generates the signal contribution for the first (m=1) sinusoidal component at the first sample point (k=0) within the current frame, in process 76. Referring now to FIG. 7, the detailed operation of sinusoid coprocessor 15 in generating the signal component in process 76 will now be described in further detail.

Process 76 begins with sinusoid coprocessor determining, in decision 89, whether the current iteration corresponds to a first sample period (k=0) in the frame. As will become further apparent from the description hereinbelow, if process 76 is generating a signal value for a later sample point (k>0) in the frame, parameter registers 26 will already contain the appropriate values for the process. However, for the first sample point (k=0), parameter registers 26 will require initialization with values corresponding to the particular sinusoidal component m, as the previously stored values will pertain to a different component. Decision 89 thus determines whether initialization of parameter registers 26 is necessary by testing the value of sample point index k. If k is non-zero (decision 89 is NO), control passes to process 94, skipping initialization of parameter registers 26. In this case, however, since sample point index k is zero, decision 89 is YES and initialization continues with process 90.

In process 90, sinusoid coprocessor 15 receives frame boundary parameters from host processor 12, specifically for the current sinusoidal component m. These parameters include, as noted above, amplitude and phase coefficient parameters $\{A_m{}^n, \alpha_m{}^{n-2}, \alpha_m{}^{n-1}\}$ and $\{A_m{}^{n+1}, \alpha_m{}^n\}$. These parameters are preferably forwarded to sinusoid coprocessor 15 either by way of direct memory access (DMA) or buffered serial ports (BSPs) of host processor 12, so as not to occupy the processing capacity of host processor 12. Sinusoid coprocessor 15 stores these received frame boundary parameters within data register and logic 22, for use in the generation of the output signal.

The particular timing with which the frame boundary parameters are forwarded by host processor 12 and received by sinusoid coprocessor 15 may be selected for purposes of efficiency. As shown in FIG. 7, the communication of frame boundary parameters for component m in the current frame may occur directly within the coprocessor operation for that component m during the frame. Of course, if these frame boundary parameters $\{A_m{}^n, \alpha_m{}^{n-2}, \alpha_m{}^{n-1}\}$ and $\{A_m{}^{n+1}, \alpha_m{}^n\}$ are available prior to the generation of the signal component for component m in frame n, host processor 12 may forward such parameters to sinusoid coprocessor 15 for storage therein, assuming that sufficient memory capacity is available within data register and logic 22 of sinusoid coprocessor 15. Such advance communication is particularly contemplated for use in connection with DMA communication between host processor 12 and coprocessor 15. In this regard, it is preferable that data register and logic 22 be implemented by way of dual-port memory, thus permitting asynchronous receipt of frame boundary parameters during the sinusoid synthesis operation. The provision of process 90 within generation process 76 as shown in FIG. 7 primarily refers to the time by which these parameters must be received by sinusoid coprocessor 15 in order to avoid a stall situation.

Further, one should note that not all of frame boundary parameters $\{A_m^n, \alpha_m^{n-2}, \alpha_m^{n-1}\}$ and $\{A_m^{n+1}, \alpha_m^n\}$ need be forwarded for each component in each frame. Rather, it will be noted by those skilled in the art having reference to this specification that, for a given component m in frame n, the parameters $\{A_m^n, \alpha_m^{n-2}, \alpha_m^{n-1}\}$ will have been previously used for component m in the previous frame n−1. As such, only the two frame boundary parameters $\{A_m^{n+1}, \alpha_m^n\}$ need be communicated for each sinusoidal component m in each frame n (outside of the first frame, which will require all five frame boundary parameters). One may therefore derive the overall data transfer requirements from host processor 12 and coprocessor 15 as two data words per component m per frame per channel, or 2M data words per frame. The bandwidth required (in this direction) will thus be the product of 2M times the frame period, times the number of channels handled by sinusoid coprocessor 15.

Once frame boundary parameters $\{A_m^n, \alpha_m^{n-2}, \alpha_m^{n-1}\}$ and $\{A_m^{n+1}, \alpha_m^n\}$ have been received in process 90, sinusoid coprocessor 15 next performs process 92 to initialize parameter registers 26 for use in the generation of the signal. This initialization is performed for each component m in each frame, as evident from the location of process 92 in generation process 76. Initialization process 92, as will become apparent from the following description, requires the addition, multiplication, and division (preferably division by a power of two so as to be carried out by way of shifts) of certain parameters. It is contemplated that these operations may be carried out by way of adders 28, 30, 32, and such other circuitry (not shown in FIG. 3), as controlled by address decoder and control circuitry 24. It is therefore contemplated that those skilled in the art will be readily able to effect initialization process 92 in the most appropriate manner for the particular realization of sinusoid coprocessor 15.

In this regard, parameter register A is initialized with the frame boundary parameter $A_m^n$. Parameter register ΔA is initialized with a delta amplitude value $\Delta A_m^n$ for component m and current frame n, derived from the frame boundary parameters by:

$$\Delta A_m^n = \frac{A_m^{n+1} - A_m^n}{L}$$

Preferably, the number of samples L within a data frame is a power of two, such that this division may be carried out by a simple right shift. Instantaneous phase parameter register θ is initialized with a calculated phase value $\theta_m^n(nL)$ that is derived from the known parameters of nominal frequency $\omega_m$, frame number n, and frame length (in number of samples) L, as well as from certain of the frame boundary parameters as follows:

$$\theta_m^n(nL) = \omega nL + \frac{\alpha_m^{n-1} - \alpha_m^{n-2}}{L}$$

Intermediate difference parameter register ΔX is loaded, in process 92, with an initial value that is derived from two operations:

$$\omega_m^{n+1} = \omega_m^n + \frac{\alpha_m^{n-1} - \alpha_m^{n-2}}{L}$$

and then:

$$\Delta x_m^n = \frac{\omega_m^{n+1} - \omega_m^n}{L}$$

The initialized contents of parameter register X is derived from the initial intermediate difference value parameter $\Delta x_m^n$ as follows:

$$x_m^n(0) = \omega_m^n - \frac{\Delta x_m^n}{2}$$

Parameter registers 26 are thus initialized in preparation for the generation of sinusoidal component signals for the initial sample point k=0 in the current frame.

In process 94 or process 94', as the case may be, sinusoid coprocessor 15 generates the next values of intermediate instantaneous amplitude $A_m^n(nL+k)$ and instantaneous phase $\theta_m^n(nL+k)$, for sample point k. For the special case of the first sample period (k=0), process 94' forwards the initialized contents of parameter registers A and θ to sine function calculator 34, considering that the contents of these parameter registers already correspond to the instantaneous amplitude value $A_m^n$ and instantaneous phase value $\theta_m^n(nL)$ for the initial sample point k=0 at the boundary of the current frame for the current sinusoidal component m. Adders 28, 30, 32 in sinusoid coprocessor 15 are effectively bypassed in this case.

In the general case where the current sample point k is not at the initial frame boundary (i.e., for k>0), process 94 derives the next values of instantaneous amplitude $A_m^n(nL+k)$ and instantaneous phase $\theta_m^n(nL+k)$ from the current contents of parameter registers 26. The instantaneous amplitude $A_m^n(nL+k)$ is produced by adder 28 by the addition of the contents of parameter register A with the contents of parameter register ΔA; the twenty-bit output of adder 28 is then forwarded back to, and stored in, parameter register A. Adder 28 thus produces instantaneous amplitude $A_m^n(nL+k)$, considering that the contents of parameter register A applied to adder 28 correspond to the instantaneous amplitude $A_m^n(nL+k-1)$ and the contents of parameter register ΔA which corresponds to the delta amplitude value $\Delta A_m^n$, such that the new instantaneous amplitude value $A_m^n(nL+k)$ is calculated according to the above-noted relationship:

$$A_m^n(nL+k) = A_m^n(nL+k-1) + \Delta A_m^n$$

for component m. In this preferred embodiment of the invention, the sixteen most significant bits of this result is forwarded to sine function calculator 34 on lines $A^n(k)$, as shown in FIG. 3. The higher precision (twenty-bit) result is used in successive additions, to avoid the accumulation of round-off error.

Process 94, for sample points k>0 within the frame, also includes the operation of adder 30 that adds the contents of parameter register ΔX to the contents of parameter register X; this operation of adder 30 corresponds to the addition:

$$x_m^n(k) = x_m^n(k-1) + \Delta x_m^n$$

considering that parameter register ΔX contains the intermediate difference value $\Delta x_m^n$ and parameter register X contains the value $x_m^n(k-1)$ from the previous sample point k−1. The output of adder 30 is then returned to parameter register X for use in connection with the next sample point k+1, and also to one input of adder 32. The second input of adder 32 receives the current contents of parameter register θ, which contains the instantaneous phase value $\theta_m^n(nL+k-1)$ derived in connection with the previous sample point k−1; adder 32 thus performs the addition:

$$\theta_m^n(nL+k) = \theta_m^n(nL+k-1) + x_m^n(k)$$

The output of adder 32, which corresponds to the current instantaneous phase $\theta_m^n(nL+k)$ for sample point k, is stored back into parameter register θ for use in connection with the next sample point k+1. The sixteen most significant bits of the output of adder 32 are also forwarded to sine function calculator 34 on lines θ''(k), as shown in FIG. 3.

In either case, whether by way of process 94 or, in the case of sample point k=0 in the current frame by way of process 94', sinusoid coprocessor 15 next executes process 96 by way of which sine function calculator 34 determines the value of the signal component $s_m^n(nL+k)$, as follows:

$$s_m^n(nL+k) = A_m^n(nL+k) \cdot \sin\{\theta_m^n(nL+k)\}$$

The operation of sine function calculator 34 in performing process 96 is described in detail hereinabove, relative to FIG. 4. As a result of this process, sine function calculator 34 presents a digital value corresponding to the signal component $s_m^n(nL+k)$ for sample point k within frame n for sinusoidal component m.

Following process 96, sinusoid coprocessor 15 next adds signal component $s_m^n(nL+k)$ from the output of sine function calculator 34 to previous signal components for previously generated sinusoidal components for sample point k in frame n (if any), in process 98. The addition of process 98 is performed by adder 36, which receives the output of sine function calculator 34 at one input and the output of AND function 39 at the other input. In the present case where the first sinusoidal component for sample point k is generated in process 96 (i.e., where m=1), line $\overline{CS}$ is driven low in process 74 and remains low; this prevents any contents of data sample buffer 40 from being presented to adder 36, and as such adder 36 simply forwards the signal component $s_1^n(nL+k)$ to register 42, and from register 42 to the entry $64_k$ of data sample buffer 40 corresponding to sample point k. As will be noted below, once line $\overline{CS}$ is driven high, the contents of data sample buffer entry $64_k$ corresponding to the current sample point k are forwarded to adder 36; in process 98, adder 36 then adds the new signal component $s_m^n(nL+k)$ to the previously accumulated signal components $s^n(nL+k)$ for that sample point k in frame n, in which case the accumulated sum:

$$\sum_{i=1}^{m} s_i^n(nL+k)$$

is then stored in entry $64_k$ of data sample buffer 40.

Referring back to FIG. 6, upon completion of process 76 in which the sinusoidal component $s_m^n(nL+k)$ is generated, sinusoid coprocessor 15 next performs decision 77 to determine if the last sample point L−1 in the current frame is the sample point which was most recently processed. If not (decision 77 is NO), the sample point index k is incremented in process 78, and channel separation control 38 enables accumulation by adder 36 and data sample buffer 40 (if not already so enabled), by driving line $\overline{CS}$ to a high level, which will cause AND function 39 to forward the output of data sample buffer 40 to adder 36 for succeeding iterations. Control then passes back to process 76, for generation of the next signal component, at the next sample point within frame n, for the current sinusoidal component m.

Upon decision 77 determining that all sample points within frame n have been processed for a given sinusoidal component (decision 77 is YES), sinusoid coprocessor 15 next executes decision 79 to determine if the last sinusoidal component has been processed, by comparing the current component index m to the number M of components in the signal. If additional components remain to be processed (decision 79 is NO), sinusoid coprocessor 15 next evaluates decision 81 to determine whether the next sinusoidal component is the last one, by comparing the current value of component index m to the value M−1. If the next component is not the last component of the signal (decision 81 is NO), sinusoid coprocessor 15 increments component index m in process 84, resets sample point index k to zero in process 88, and returns control to process 76 for the generation of the first sample point value for the next sinusoidal component. The operations of process 76 and decisions 77, 79 then continues to process this next component.

If the next component is indeed the last component (decision 81 is YES), however, channel separation control 38 then enables output buffer 44 in process 82, by driving line OE to an active level. Control then passes to process 82 for the incrementing of the component index (to the value M) and to process 88 for the resetting of sample point index k. With output buffer 44 enabled by process 82 in this instance, the output produced from process 76 at adder 36, via register 42, will be driven by output buffer 44 for receipt by host processor 12, for each of the L sample points for the current frame. Upon completion of all L sample points in the frame (decision 77 is YES), decision 79 will also return a YES result because, at this point, component index m will equal the terminal value M. Sinusoid coprocessor 15 will then perform decision 83 to determine whether additional channels (i.e., independent signals) remain to be generated in the current frame. If so (decision 83 is YES), control passes back to process 70 for initialization of sinusoid coprocessor 15 for this next channel's signal. If not (decision 83 is NO), control passes to process 88 in which host processor 12 and sinusoid coprocessor 15 carry out the appropriate actions, by way of issuing and executing instructions, for example, to advance to the next frame following which the process of FIG. 6 may be repeated, if desired.

The architecture, construction, operation, and use of a sinusoid coprocessor according to the present invention provides numerous advantages in the synthesis of signals. Firstly, the arithmetic operations performed by the coprocessor in signal synthesis are relatively simple and may be carried out primarily by way of adds and shifts. As such, it is contemplated that the computational rate achievable by relatively modest circuitry may be quite high. For example, through simulation, it is contemplated that a sinusoid coprocessor according to the preferred embodiment of the invention may be realized in approximately 9,500 logic gates with 2k bits of dual-port memory, and that, using modern $0.25\mu$ CMOS technology for transistor construction, such a coprocessor can achieve on the order of 95 million sine computations per second. At this performance level, it has been estimated that a signal composed of over 2000 sinusoidal components may be synthesized, in real-time, at a sampling rate of 44.1 kHz as suitable for music synthesis. It is therefore contemplated that the rate at which signals may be synthesized by a sinusoid coprocessor according to the present invention will be limited by the data transfer bandwidth over which an associated host processor may communicate the frame boundary parameters, rather than by the internal computational rate of the coprocessor.

Furthermore, the present invention facilitates the generation of multi-channel signal synthesis, by providing control for the separation of channels in the accumulation of signal components and the control of the output of the signal values.

Still further, it is contemplated that the relatively modest circuit requirements for a sinusoid coprocessor according to the present invention will enable the implementation of such sinusoid coprocessors in a wide range of electronic systems, including low-cost systems suitable for introduction into the consumer market.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A coprocessor for synthesis of a digital signal corresponding to a sum of sinusoids, comprising:

a plurality of parameter registers for storing parameters corresponding to a previous sample point in a frame, the plurality of parameter registers comprising an amplitude register, a delta amplitude register, a phase register, a difference register, and a delta difference register;

a first adder for adding the contents of the amplitude register and the delta amplitude register to produce a current amplitude value for a current sample point in the frame, the first adder having an output coupled to the amplitude register to update the contents thereof;

a second adder for adding the contents of the difference register and the delta difference register, the second adder having an output coupled to the difference register to update the contents thereof;

a third adder having inputs coupled to the output of the second adder and to the phase register, for adding at least a portion of the output of the second adder to the contents of the phase register to produce a current phase value for the current sample point in the frame, the third adder having an output coupled to the phase register to update the contents thereof;

sine function calculator circuitry, having inputs coupled to the output of the first adder and to the output of the third adder, for generating a digital value corresponding to a sine of the current value at the current amplitude value; and accumulator circuitry, for adding the digital value at the output of the sine function calculator circuitry to previously calculated digital values for the current sample point in the frame.

2. The coprocessor of claim 1, further comprising:

data register and logic circuitry, for receiving parameters from a host processor and for initializing the plurality of parameter registers; and an output buffer, coupled to the accumulator circuitry, for presenting accumulated digital values.

3. The coprocessor of claim 2; wherein the accumulator circuitry comprises:

a data sample buffer, having a plurality of entries, each entry corresponding to a sample point in the frame, and having addressing circuitry for accessing the contents of the one of the entries corresponding to the current sample point in the frame; and an accumulator adder, having a first input coupled to the output of the sine function calculator circuitry, having a second input coupled to an output of the data sample buffer to receive the contents of the accessed entry, and having an output coupled to the output buffer and to an input of the data sample buffer, the adder for adding the digital value at the output of the sine function calculator circuitry to the contents of the accessed entry of the data sample buffer to produce an accumulated result;

wherein the data sample buffer writes the accumulated result at its input to the accessed entry of the data sample buffer.

4. The coprocessor of claim 3, further comprising:

a gate, having a data input coupled to the output of the data sample buffer, having a control input, and having an output coupled to the second input of the accumulator adder; and channel separation control, having a first output coupled to the control input of the gate, for blocking the output of the data sample buffer from the second input of the accumulator adder for a first sinusoid of the sum of sinusoids.

5. The coprocessor of claim 4, wherein the channel separation control has a second output coupled to a control input of the output buffer, for enabling the output buffer to present accumulated digital values to the host processor for a last sinusoid of the sum of sinusoids.

6. The coprocessor of claim 1, wherein the sine function calculator circuitry comprises:

a phase register, having an input coupled to the output of the third adder for receiving the current phase value;

an X register, having an input coupled to the output of the first adder for receiving the current amplitude value;

a Y register;

a first right shift register, coupled to the output of the X register, for shifting its contents by a selected number of bits;

a second right shift register, coupled to the output of the Y register, for shifting its contents by the selected number of bits;

first and second inverting circuits, each having a control input, for selectively inverting the outputs of the first and second right shift registers, respectively, responsive to a signal at the control input;

a Y adder, having a first input coupled to the Y register and a second input coupled to an output of the first inverting circuit, and having an output coupled to an input of the Y register and to the accumulator circuitry;

an X adder, having a first input coupled to the X register and a second input coupled to an output of the second inverting circuit, and having an output coupled to an input of the X register; and a phase comparator, having a first input coupled to the phase register and having a second input coupled to an angle table, having a sign output coupled to the control inputs of the first and second inverting circuits, and having an output coupled to the phase register.

7. The coprocessor of claim 1, further comprising:

data register and logic circuitry, for receiving parameters from a host processor and for initializing the plurality of parameter registers, the data register and logic circuitry including memory space for storing parameters corresponding to a plurality of sinusoids of the sum of sinusoids.

8. A method of synthesizing a digital signal corresponding to a sum of a plurality of sinusoidal components, comprising the steps of:

for a first frame, corresponding to a period of time including a first plurality of sample points, receiving frame boundary parameters for each of a plurality of sinusoidal components;

for a first sinusoidal component, initializing the contents of a plurality of parameter registers corresponding to a previous sample point in a frame, the plurality of parameter registers storing an amplitude value, a delta amplitude value, a phase value, a difference value, and a delta difference value;

for each of a plurality of sample points in the frame for the first sinusoidal component, iteratively generating a sinusoidal sample value having an amplitude corresponding to a sum of the amplitude value and the delta amplitude value, times the sine of a phase angle corresponding to a sum of a phase value with a sum of the difference value and delta difference value;

storing the sinusoidal sample values for the first sinusoidal component in a buffer;

repeating the initialization, generating, and storing steps for each of a plurality of sinusoidal components, wherein the storing step accumulates the sinusoidal sample values for each of the plurality of sample points, over the plurality of sinusoidal components; and after the initialization, generating, and storing steps for the plurality of sinusoidal components, outputting the accumulated sinusoidal sample values.

9. The method of claim 8, further comprising:

repeating the receiving step, the repeated initialization, generating, and storing steps, and the outputting step, for a plurality of frames.

10. The method of claim 8, wherein the generating step comprises:

adding the amplitude value and the delta amplitude value to produce a current amplitude value;

updating the amplitude value in the parameter registers with the current amplitude value;

adding the difference value and the delta difference value to produce a current difference value;

updating the difference value in the parameter registers with the current difference value;

adding the current difference value and the phase value to produce a current phase value;

updating the phase value in the parameter registers with the current phase value; and calculating the sinusoidal sample value from the current amplitude and current phase values.

11. The method of claim 8, wherein the calculating step comprises:

loading a first register with the current amplitude value;

loading a phase register with the current phase value;

for a preselected plurality of iterations, performing a sequence of operations comprising:

comparing contents of the phase register with one of a sequence of angles;

updating the contents of the phase register with a difference resulting from the comparing step;

cross-adding first and second shifted values to the contents of a second register and the first register, respectively, the first and second shifted values corresponding to the contents of the first and second registers, respectively, shifted right by a number of bits corresponding to the iteration, and wherein the signs of the cross-addition correspond to a sign value generated in the comparing step; and updating the contents of the first and second registers with the results of the cross-adding step;

wherein the sinusoidal sample value is output from the second register after the preselected number of iterations.

12. The method of claim 8, wherein the storing step comprises:

retrieving the contents of one of a plurality of entries of the buffer, the entry corresponding to a current sample point;

adding the sinusoidal sample value for the current sample point to the retrieved contents to produce an accumulated sinusoidal sample value for the current sample point and storing the accumulated sinusoidal sample value in the entry of the buffer corresponding to the current sample point.

13. The method of claim 12, further comprising:

during the generating and storing steps for the first sinusoidal component, blocking the adding of the sinusoidal sample value for the current sample point to the retrieved contents.

14. The method of claim 12, wherein the outputting step comprises:

outputting the accumulated sinusoidal sample values during the generating step for a last sinusoidal component.

15. An electronic system, comprising:

a host processor, for executing instructions;

at least one input/output device coupled to the host processor; and a coprocessor, coupled to the host processor, for synthesis of a digital signal corresponding to a sum of sinusoids, comprising:

data register and logic circuitry, for receiving parameters from a host processor;

a plurality of parameter registers, coupled to the interface, for storing parameters corresponding to a previous sample point in a frame, the plurality of parameter registers comprising an amplitude register, a delta amplitude register, a phase register, a difference register, and a delta difference register;

a first adder for adding the contents of the amplitude register and the delta amplitude register to produce a current amplitude value for a current sample point in the frame, the first adder having an output coupled to the amplitude register to update the contents thereof;

a second adder for adding the contents of the difference register and the delta difference register, the second adder having an output coupled to the difference register to update the contents thereof;

a third adder having inputs coupled to the output of the second adder and to the phase register, for adding at least a portion of the output of the second adder to the contents of the phase register to produce a current phase value for the current sample point in the frame, the third adder having an output coupled to the phase register to update the contents thereof;

sine function calculator circuitry, having inputs coupled to the output of the first adder and to the output of the third adder, for generating a digital value corresponding to a sine of the current phase value at the current amplitude value;

accumulator circuitry, for adding the digital value at the output of the sine function calculator circuitry to previously calculated digital values for the current sample point in the frame; and an output buffer, coupled to the accumulator circuitry, for presenting accumulated digital values.

16. The system of claim 15, wherein the accumulator circuitry comprises:

a data sample buffer, having a plurality of entries, each entry corresponding to a sample point in the frame, and having addressing circuitry for accessing the contents of the one of the entries corresponding to the current sample point in the frame; and an accumulator adder, having a first input coupled to the output of the sine function calculator circuitry, having a second input coupled to an output of the data sample buffer to receive the contents of the accessed entry, and having an output coupled to the output buffer and to an input of the data sample buffer, the adder for adding the digital value at the output of the sine function calculator circuitry to the contents of the accessed entry of the data sample buffer to produce an accumulated result;

wherein the data sample buffer writes the accumulated result at its input to the accessed entry of the data sample buffer.

17. The system of claim 16, further comprising:

a gate, having a data input coupled to the output of the data sample buffer, having a control input, and having an output coupled to the second input of the accumulator adder; and channel separation control, having a first output coupled to the control input of the gate for blocking the output of the data sample buffer from the second input of the accumulator adder for a first sinusoid of the sum of sinusoids, and having a second output coupled to a control input of the output buffer, for enabling the output buffer to present accumulated digital values to the host processor for a last sinusoid of the sum of sinusoids.

18. The system of claim 15, wherein the sine function calculator circuitry comprises:

a phase register, having an input coupled to the output of the third adder for receiving the current phase value;

an X register, having an input coupled to the output of the first adder for receiving the current amplitude value;

a Y register;

a first right shift register, coupled to the output of the X register, for shifting its contents by a selected number of bits;

a second right shift register, coupled to the output of the Y register, for shifting its contents by the selected number of bits;

first and second inverting circuits, each having a control input, for selectively inverting the outputs of the first and second right shift registers, respectively, responsive to a signal at the control input;

a Y adder, having a first input coupled to the Y register and a second input coupled to an output of the first inverting circuit, and having an output coupled to an input of the Y register and to the accumulator circuitry;

an X adder, having a first input coupled to the X register and a second input coupled to an output of the second inverting circuit, and having an output coupled to an input of the X register; and a phase comparator, having a first input coupled to the phase register and having a second input coupled to an angle table, having a sign output coupled to the control inputs of the first and second inverting circuits, and having an output coupled to the phase register.

19. The system of claim 16, further comprising:

post-processing circuitry, coupled to the output buffer to receive the accumulated digital values.

* * * * *